United States Patent
Rossi (10) Patent No.: US 7,365,784 B2
(45) Date of Patent: Apr. 29, 2008

(54) COLUMN SAMPLE-AND-HOLD CELL FOR CMOS APS SENSOR

(75) Inventor: Giuseppe Rossi, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 881 days.

(21) Appl. No.: 10/413,365

(22) Filed: Apr. 15, 2003

(65) Prior Publication Data

US 2004/0207740 A1 Oct. 21, 2004

(51) Int. Cl.
*H04N 3/14* (2006.01)
*H04N 5/335* (2006.01)

(52) U.S. Cl. ...................... 348/308; 348/294
(58) Field of Classification Search ........ 340/294–312; 250/208.1; 348/294–312
See application file for complete search history.

(56) References Cited

U.S. PATENT DOCUMENTS 6,844,896 B2 * 1/2005 Henderson et al. ......... 348/241
2004/0159771 A1 * 8/2004 Yang et al. ............... 250/208.1

* cited by examiner

*Primary Examiner*—Brian Casler
*Assistant Examiner*—Nasir Shahrestani
(74) *Attorney, Agent, or Firm*—Dickstein Shapiro LLP (57) ABSTRACT

A sample and hold readout circuit and method of operation which minimizes fixed pattern noise during a read out operation. The circuit improves the consistency of the pixel to pixel output of the pixel array and increases the dynamic range of the pixel output. This is accomplished by eliminating the crowbar between the storage elements in the sample and hold circuit. Switches are added to isolate the sample and hold circuit from the column line coupled to the pixel array and to short the front plates of the capacitors together. Activating these switches allows the signals stored in the sample and hold circuit to be transferred downstream without the use of a crowbar switch.

23 Claims, 8 Drawing Sheets

COLUMN SAMPLE-AND-HOLD CELL FOR CMOS APS SENSOR

FIELD OF THE INVENTION

The invention relates generally to semiconductor imaging devices and in particular to an imaging device which can be fabricated using a standard CMOS process. Particularly, the invention relates to a CMOS active pixel sensor (APS) imager having an array of pixel cells and to the column circuitry for reading the cells.

BACKGROUND OF THE INVENTION

Figure 1:
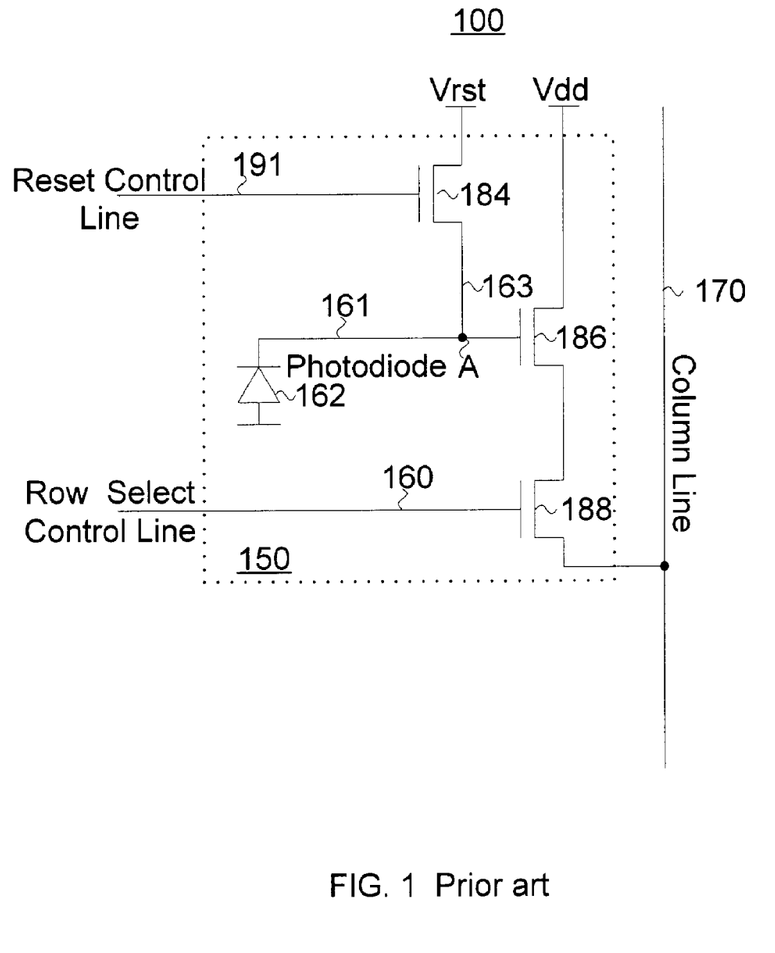
FIG. 1 is a schematic diagram of a prior art active pixel.

There is a current interest in CMOS active pixel imagers for use as low cost imaging devices. An exemplary pixel circuit of a CMOS active pixel sensor (APS) is described below with reference to FIG. 1. Active pixel sensors can have one or more active transistors within the pixel unit cell, can be made compatible with CMOS technologies, and promise higher readout rates compared to passive pixel sensors. The pixel circuit of FIG. 1, designated generally by reference number 100, includes an exemplary pixel cell 150, which is a 3T APS cell, where the 3T is commonly used in the art to designate use of three transistors to operate the pixel. The 3T pixel cell 150 includes a photodiode 162, reset transistor 184, source follower transistor 186, and a row select transistor 188. It should be understood that while FIG. 1 shows the circuitry for operation of a single pixel, in practical use there will be an M by N array of identical pixels arranged in rows and columns, with the pixels of the array accessed using row and column select circuitry, as described in more detail below.

The photodiode 162 of the 3T pixel cell 150 converts incident photons to electrons which collect at node A. The source follower transistor 186 has its gate connected to node A and thus amplifies the signal appearing at node A. The signal amplified by transistor 186 is passed on a column line 170 to the readout circuitry when a particular row containing the cell 150 is selected by the row selection transistor 188. The photodiode 162 accumulates a photo-generated charge in a doped region of the substrate. It should be understood that the CMOS imager might include a photogate or other photoconversion device, in lieu of a photodiode, for producing photo-generated charge.

A reset voltage source Vrst is selectively coupled through reset transistor 184 to node A. The gate of the reset transistor 184 is coupled to a reset control line 191 which serves to control the reset operation (i.e., Vrst is connected to node A). Vrst may be Vdd. The row select control line 160 is coupled to all of the pixels of the same row of the array. Voltage source Vdd is coupled to a source follower transistor 186 and its output is selectively coupled to a column line 170 through the row select transistor 188. Although not shown in FIG. 1, the column line 170 is coupled to all of the pixels of the same column of the array and typically has a current load at its lower end. The gate of the row select transistor 188 is coupled to the row select control line 160.

As known in the art, a two step process is used to read a value from pixel 150. During a charge integration period, the photodiode 162 converts photons to electrons which collect at the node A. The charges at node A are amplified by source follower transistor 186 and selectively passed to the column line 170 by the row access transistor 188. During a reset period, node A is reset by turning on the reset transistor 184, such that the reset voltage Vrst is applied to node A and read out to the column line 170 by the source follower transistor 186 through the activated row select transistor 188. As a result, the two different values—the reset voltage Vrst and the image signal voltage Vsig—are readout from the pixel and sent by the column line 170 to the readout circuitry where each is sampled and held for further processing as known in the art.

All pixels in a row are read out simultaneously onto respective column lines 170 and the column lines are activated in sequence for reset and signal voltage read out. The rows of pixels are also read out in sequence onto the respective column lines.

Figure 2:
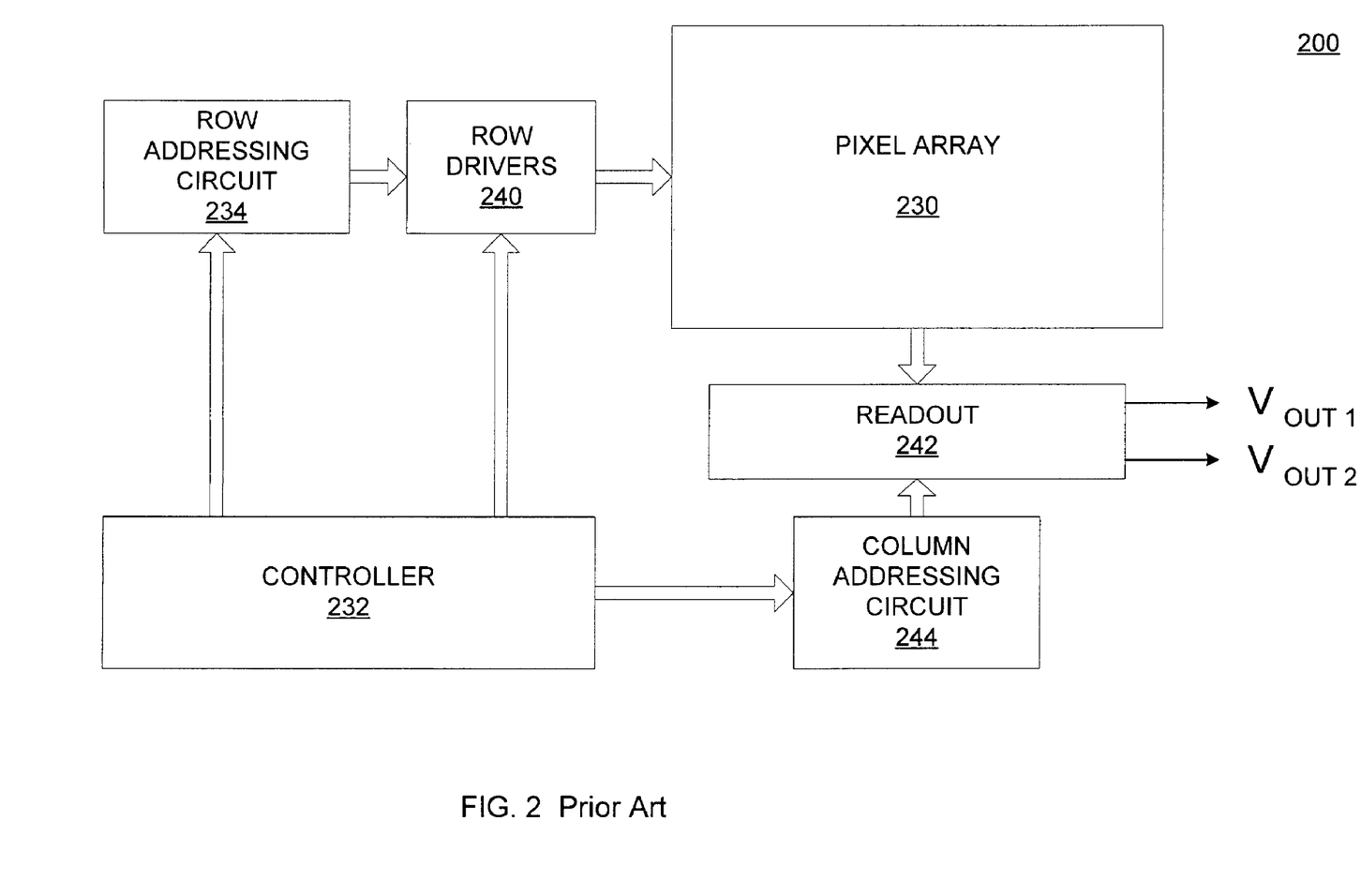
FIG. 2 is a block diagram of a prior art CMOS active sensor chip.

FIG. 2 shows a CMOS active pixel sensor integrated circuit chip that includes a pixel array 230 and a controller 232 which provides timing and control signals to enable the reading out of signals stored in the pixels in a manner commonly known to those skilled in the art. Exemplary arrays have dimensions of M×N pixels, with the size of the array 230 depending on a particular application. The imager is read out a row at a time using a column parallel readout architecture. The controller 232 selects a particular row of pixels in the array 230 by controlling the operation of row addressing circuit 234 and row drivers 240. Charge signals stored in the selected row of pixels are provided on the column lines 170 (FIG. 1) to a readout circuit 242 in the manner described above. The pixel signal read from each of the columns then can be read out sequentially using a column addressing circuit 244. The differential signal, Vdiff=(Vrst−Vsig), corresponds to the reset signal minus the integrated charge signal and is provided by the outputs Vout2, Vout1 of the readout circuit 242.

Figure 3:
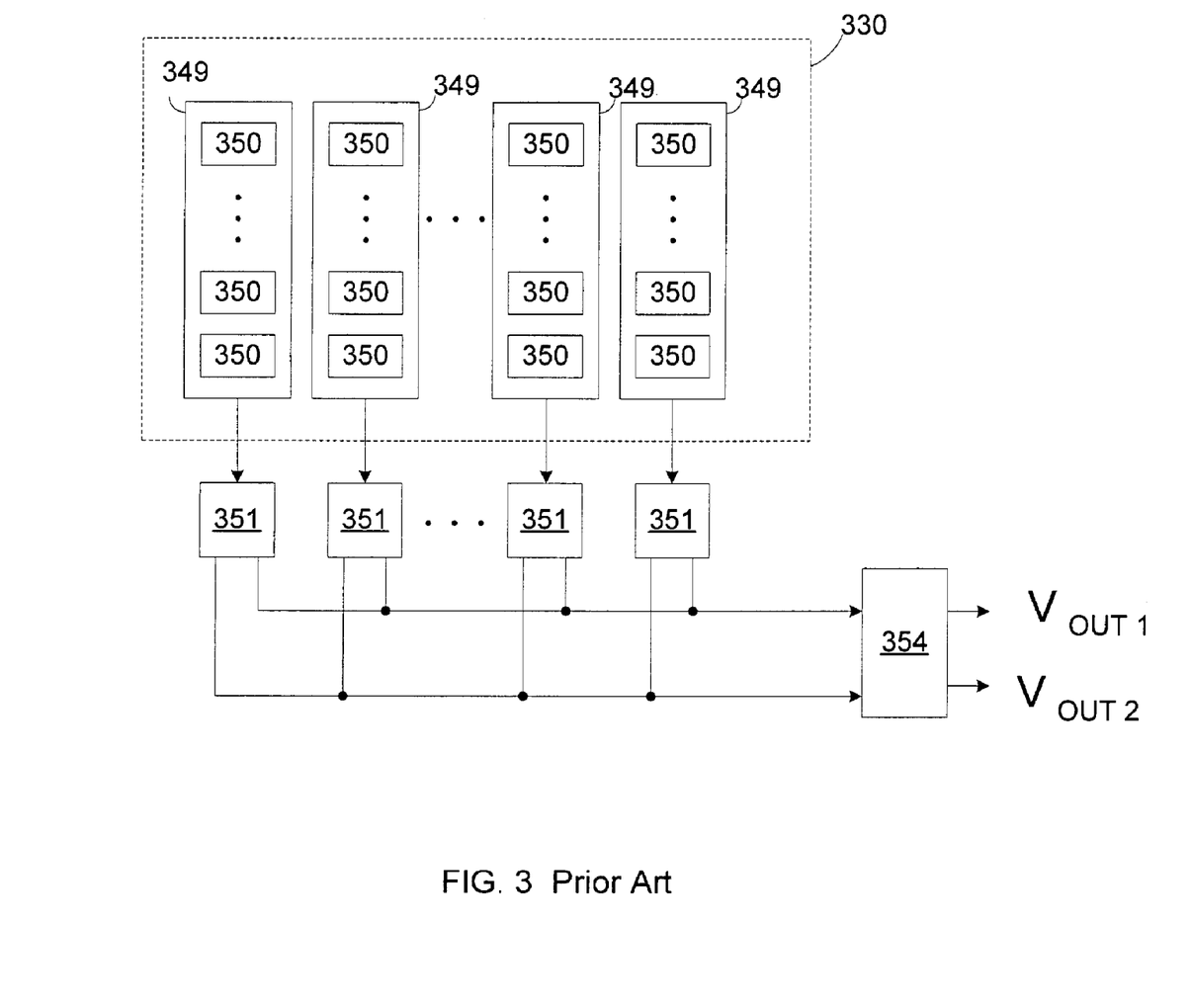
FIG. 3 is a block diagram of a prior art array of active pixels and an associated readout circuit.

FIG. 3 more clearly shows the rows and columns 349 of pixels 350. Each column includes multiple rows of pixels 350. Signals from the pixels 350 in a particular column can be read out to a readout circuit 351 associated with that column. The read out circuit 351 includes sample and hold circuitry for acquiring the pixel reset (Vrst) and integrated charge signals (Vsig). Signals stored in the readout circuits 351 can be read sequentially, column-by-column, to an output stage 354 which is common to the entire array of pixels 330. The analog output signals can then be sent, for example, to a differential analog circuit and which subtracts the reset and integrated charge signals, (e.g., combines the two voltages and determines the difference between the circuits) and sends them to an analog-to-digital converter (ADC), or the reset and integrated charge signals are each supplied to the analog-to-digital converter.

Figure 4:
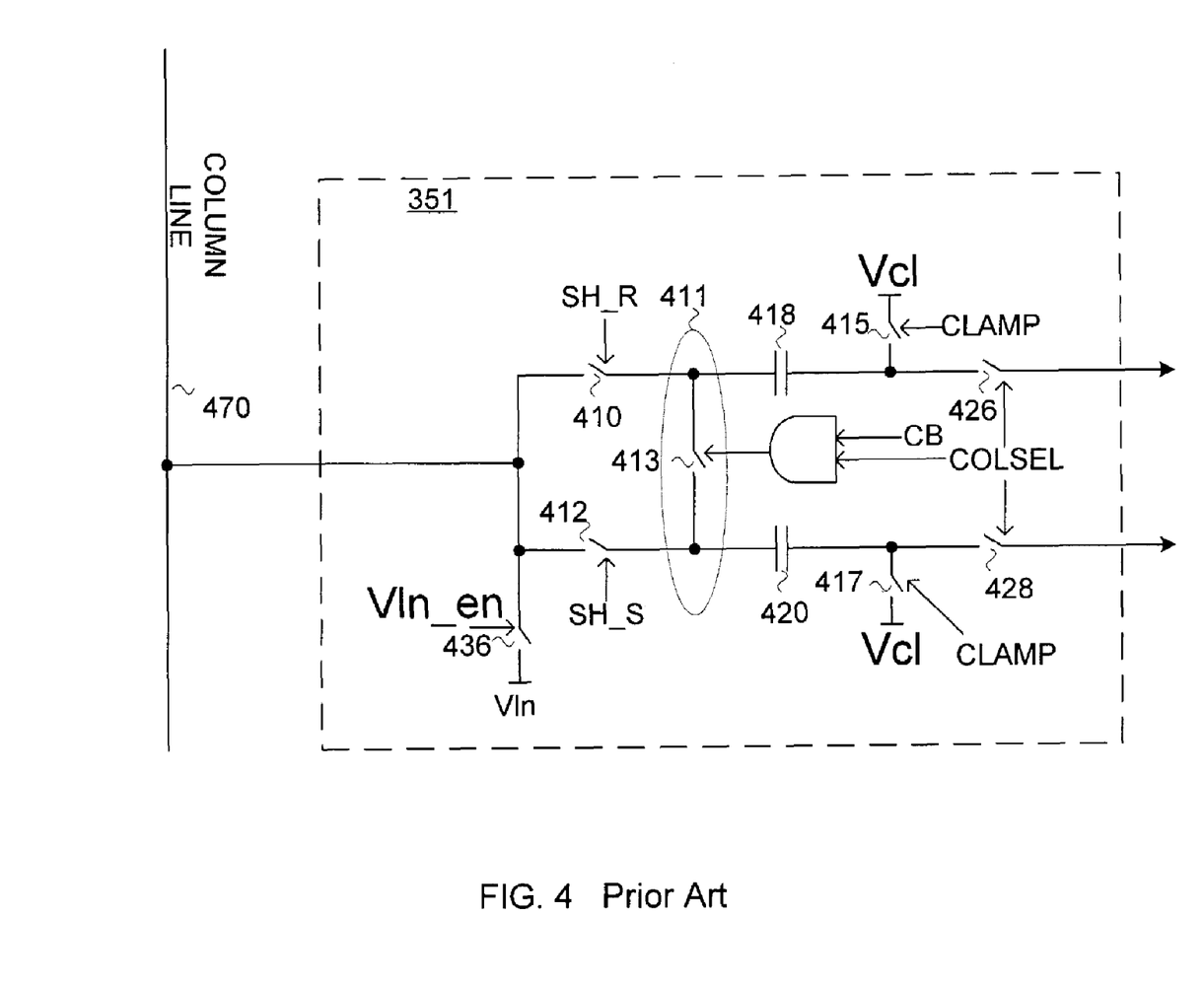
FIG. 4 is a schematic diagram of a prior art sample and hold circuit.

FIG. 4 shows a sample and hold readout circuitry contained in column readout circuit 351. The FIG. 4 circuit samples and holds the Vsig and Vrst values for subsequent use by an output stage 354 (FIG. 3). For example, a Vsig from a desired pixel ("Vsig1") coupled to a column line 470 is stored on capacitor 420 and a Vrst from the desired pixel ("Vrst1") is stored on capacitor 418. Then the Vrst and Vsig signals for the desired pixel are readout to an output stage 354 (FIG. 3).

As seen in FIG. 4, the column line 470 is selectively coupled through SH_R switch 410 to the front side of capacitor 418. The backside of capacitor 418 is selectively coupled through switch 426 to a first input to output stage 354. The front side of capacitor 418 is also selectively coupled through crowbar 411, which includes a switch 413, to the front side of capacitor 420. The column line 470 is also selectively coupled through SH_S switch 412 to the front side of capacitor 420. The backside of capacitor 420 is selectively coupled through switch 428 to a second input to output stage 354. A clamp voltage Vcl (e.g., Vclamp) is selectively coupled to the backside of capacitor 418. Vcl (e.g., Vclamp) is selectively coupled through a switch 415 to the backside of capacitor 418. Vcl is also selectively coupled through another switch 417 to the backside of capacitor 420. A line voltage, e.g., a load voltage, Vln is selectively coupled through switch 436 and switch 410 to the front side of capacitor 418. A line voltage Vln is also selectively coupled through switch 436 and switch 412 to the front side of capacitor 420. The line voltage Vln is typically coupled to a current source for biasing the source follower transistor of the selected pixel.

Figure 5:
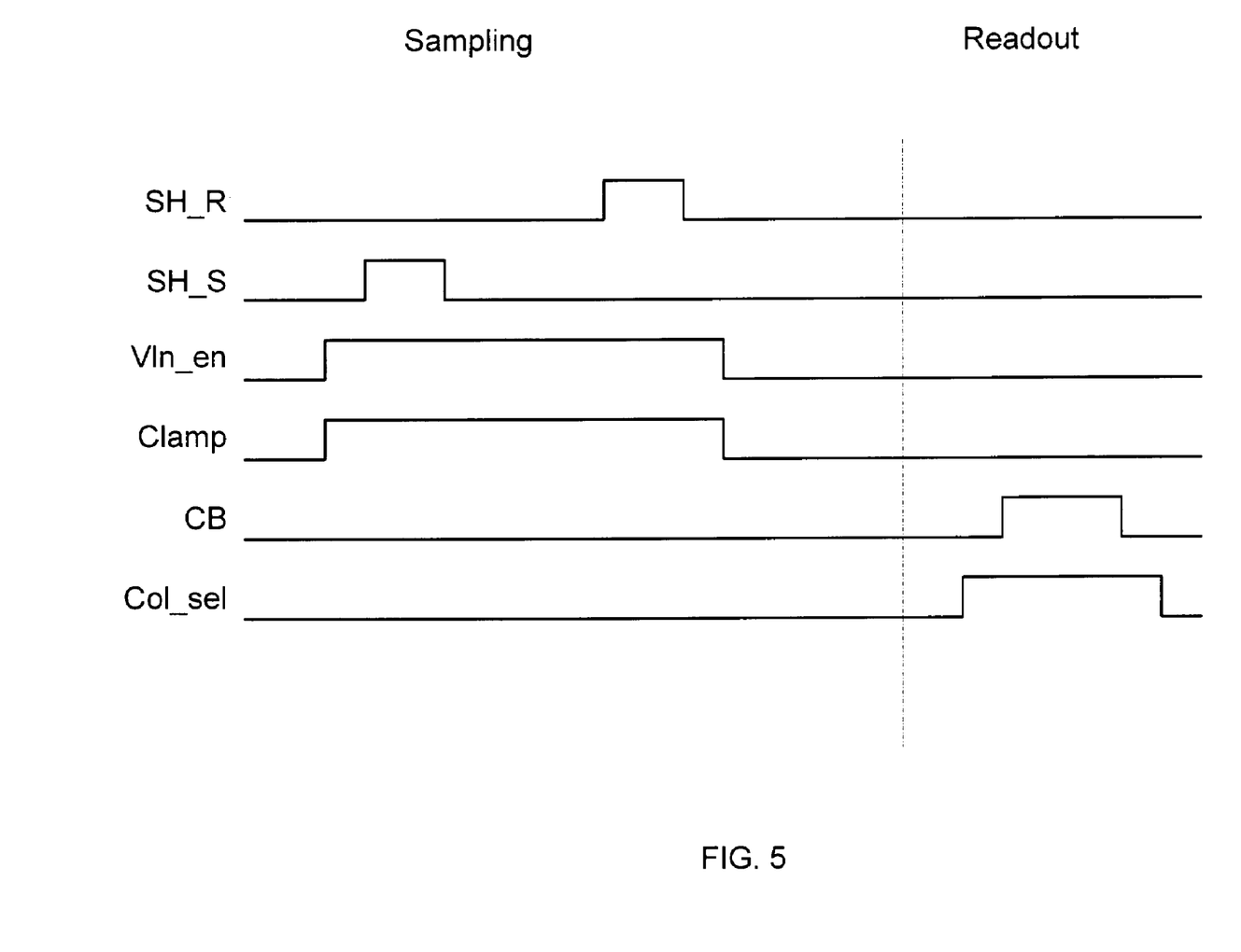
FIG. 5 is a simplified timing diagram associated with the circuitry of FIG. 4.

The operation of the FIG. 4 circuit is now described with reference to the simplified signal timing diagram of FIG. 5 (assuming a readout from a 3T pixel). To store Vsig and Vrst from the desired pixel, a pulse signal CLAMP is applied which temporarily closes the switches 415, 417 and couples a Vclamp voltage to the back of the capacitors 418, 420 placing a charge on the respective back sides of respective capacitors. A pulse signal Vln_en is also applied which couples the desired pixel to a Vln voltage through the column line 470. To store Vsig on capacitor 420 while the pixel is in the signal sampling phase, a pulse signal SH_S is applied which temporarily closes the switch 412 and couples the desired pixel with the front side of capacitor 420 through the column line 470. Thus, Vsig is stored on capacitor 420. After the desired pixel is pulsed by a pixel reset signal, the pixel is in reset signal sampling phase. To store Vrst on capacitor 418 pulse signal SH_R is applied which temporarily closes the switch 410 and couples the desired pixel with the front side of capacitor 418 through the column line 470. Thus, Vrst is stored on capacitor 418.

To transfer Vsig and Vrst through the output stage 354 (FIG. 3), pulse signals COLSEL and CB, are applied which temporarily close switches 413, 426, and 428 and forces the signal stored on the back side of the respective capacitor 418, 420 through output stage 354. Thus, the amplified Vsig and Vrst signals are forced downstream to output stage 354.

One issue associated with the APS CMOS imaging systems is that of fixed pattern noise, which is type of distortion in the image captured by the imaging system. One source of fixed pattern noise is due to imperfections in the sample and hold circuit. The layout of the sample and hold circuit contributes to the amount of fixed pattern noise. In particular, the crowbar switch in the sample and hold circuit, i.e., 413 in FIG. 4, introduces a potential asymmetry in the cell with different coupling strengths among the sampling capacitor nodes. Due to the delta sampling nature of the timing scheme, floating capacitor plates are still present in the circuit with a direct coupling to each other and this presents a detrimental effect for any further improvement to the sensor fixed pattern noise. Additionally, the crowbar switch acts as a memory cell for the common mode voltage of the previously read-pixel belonging to the earlier row.

A sample and hold circuit having a reduced fixed pattern noise is desired.

SUMMARY OF THE INVENTION

The present invention provides an improved sample and hold readout circuit and method of operation which reduces fixed pattern noise during a read out operation. The circuit improves the consistency of the pixel to pixel output of the pixel array and increases the dynamic range of the pixel output. This is accomplished by eliminating the crowbar switch between the storage areas in the sample and hold circuit. Additionally, a switch is added further isolating the sample and hold circuit from the column line coupled to the pixel array. In this manner, the signals stored in the sample and hold circuit are transferred downstream by isolating the sample and hold circuit from the global column line and then using the sampling switches SH_R and SH_S to short the front plates of the capacitors together. This has the additional advantage of creating a more symmetrical sample and hold circuit.

These and other features and advantages of the invention will be more readily understood from the following detailed description of the invention which is provided in connection with the accompanying drawings.

DETAILED DESCRIPTION OF THE INVENTION

In the following detailed description, reference is made to the accompanying drawings, which form a part hereof, and in which is shown by way of illustration specific embodiments in which the invention may be practiced. These embodiments are described in sufficient detail to enable those of ordinary skill in the art to make and use the invention, and it is to be understood that structural, logical or other changes may be made to the specific embodiments disclosed without departing from the spirit and scope of the present invention.

The present invention eliminates the crowbar switch and utilizes the sampling switches to short the front plates of the capacitors together when performing a read out from the sample and hold circuit.

Figure 6:
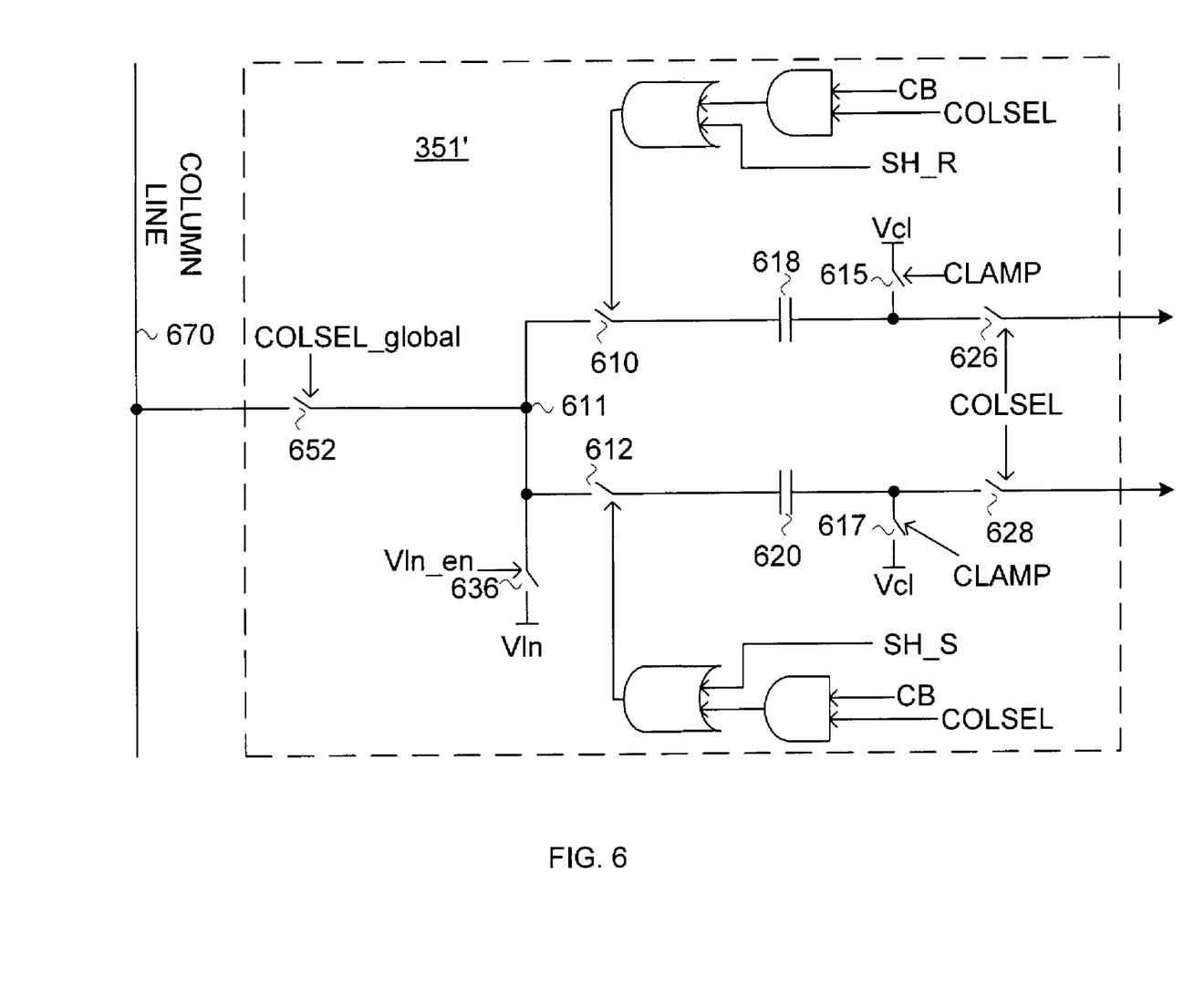
FIG. 6 is a schematic diagram of a sample and hold circuit in accordance with an exemplary embodiment of the invention.
Figure 7:
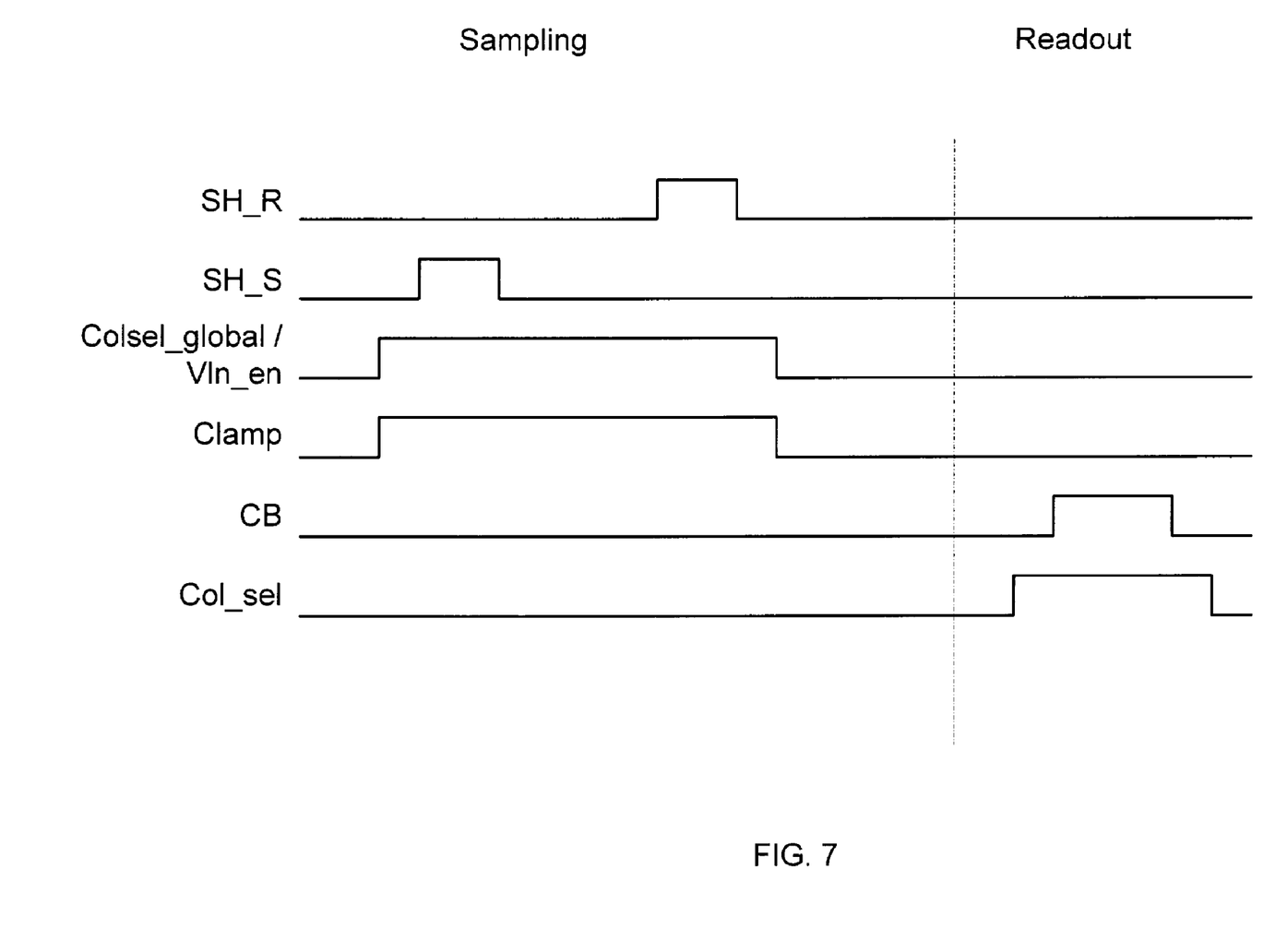
FIG. 7 is a simplified timing diagram associated with the circuitry of FIG. 6.

An embodiment of the invention is shown and described with reference to FIGS. 6 and 7. The sample and hold circuit 351' of FIG. 6 is different from the sample and hold circuit 351 of FIG. 4 in several respects: the crowbar 411 circuit including crowbar switch 413 is eliminated and a COLSEL_global switch 652 is added. Additionally, the SH_R switch 610 is controlled by either a SH_R or a transfer control signal, e.g., the signal resulting from AND'ing CB and COL_SEL signal. The SH_S switch 612 is controlled by either a SH_S signal or a transfer control signal.

As seen in FIG. 6, a column line 670 is selectively coupled through a COLSEL_global switch 652 to a node 611. Node 611 is coupled through a switch 610 to the input side of capacitor 618. The switch 610 is closed when either a SH_R or a CB and COL_SEL pulse is enabled. The output side of capacitor 618 is selectively coupled through switch 626 to a first input to output stage 354. Node 611 is also selectively coupled through a switch 612 to the input side of capacitor 620. The switch 612 is closed when either a SH_S or a CB and COL_SEL pulse is enabled. The output side of capacitor 620 is selectively coupled through switch 628 to a second input to output stage 354. A clamp voltage Vcl (e.g., Vclamp) is selectively coupled to the output side of capacitor 618 through switch 615. Vcl is also selectively coupled through switch 617 to the output side of capacitor 620. A line voltage Vln is selectively coupled through switch 636 and switch 610 to the input side of capacitor 618. A line voltage Vln is also selectively coupled through switch 636 and switch 612 to the input side of capacitor 620.

The operation of the FIG. 6 circuit is now described with reference to the simplified signal timing diagram of FIG. 7 (assuming a readout from a 3T pixel). To store Vsig and Vrst from the desired pixel, a pulse signal CLAMP is applied which temporarily closes the switches 615, 617 and couples a Vclamp voltage with the output side of the capacitors 618, 620 and places a charge on the respective output side of respective capacitors. A pulse signal COLSEL_global is also applied which closes switch 652 and couples node 611 to the column line 670. A pulse signal Vln_en is also applied which couples node 611, and the desired pixel through the column line 670 and node 611, to a Vln voltage.

To store Vsig on capacitor 620 while the pixel is in the signal sampling phase, a pulse signal SH_S is applied which temporarily closes the switch 612 and couples the desired pixel with the input side of capacitor 620 through the column line 670. The input side of capacitor 618 is also coupled to the Vln voltage through switches 610 and 636. Thus, Vsig is stored on capacitor 620. After Vsig is stored, switch 610 is opened, thereby isolating the input side of capacitor 618 from the desired pixel and the Vln voltage.

After the desired pixel is pulsed by a pixel reset signal, the pixel is in reset signal sampling phase. To store Vrst on capacitor 618, pulse signal SH_R is applied, which temporarily closes the switch 610 and couples the desired pixel with the front side of capacitor 618 through the column line 670. The input side of capacitor 620 is also coupled to the Vln voltage through switches 612 and 636. Thus, Vrst is stored on capacitor 618. After Vrst is stored, switch 612 is opened, thereby isolating the input side of capacitor 620 from the desired pixel and the Vln voltage and switch 652 and 636 are opened, isolating the common node 611 from the column line 670 and Vln voltage. Alternatively, switch 612 remains closed and switches 652 and 636 are opened, thereby isolating the input side of capacitor 620 from the desired pixel and the Vln voltage.

To transfer Vsig and Vrst through the output stage 354 (FIG. 3) with switches 652 and 636 open, a pulse signal COLSEL is applied which temporarily closes switches 626 and 628. Then a pulse signal CB is applied which temporarily closes SH_R/CB-COL_SEL, SH_S/CB-COL_SEL switches 610 and 612, thereby shorting the input of capacitor 618 to the input side of capacitor 620 and forcing the signal stored on the output side of the respective capacitor 618, 620 through output stage 354. Thus, the amplified Vsig and Vrst signals are forced downstream to output stage 354.

Figure 8:
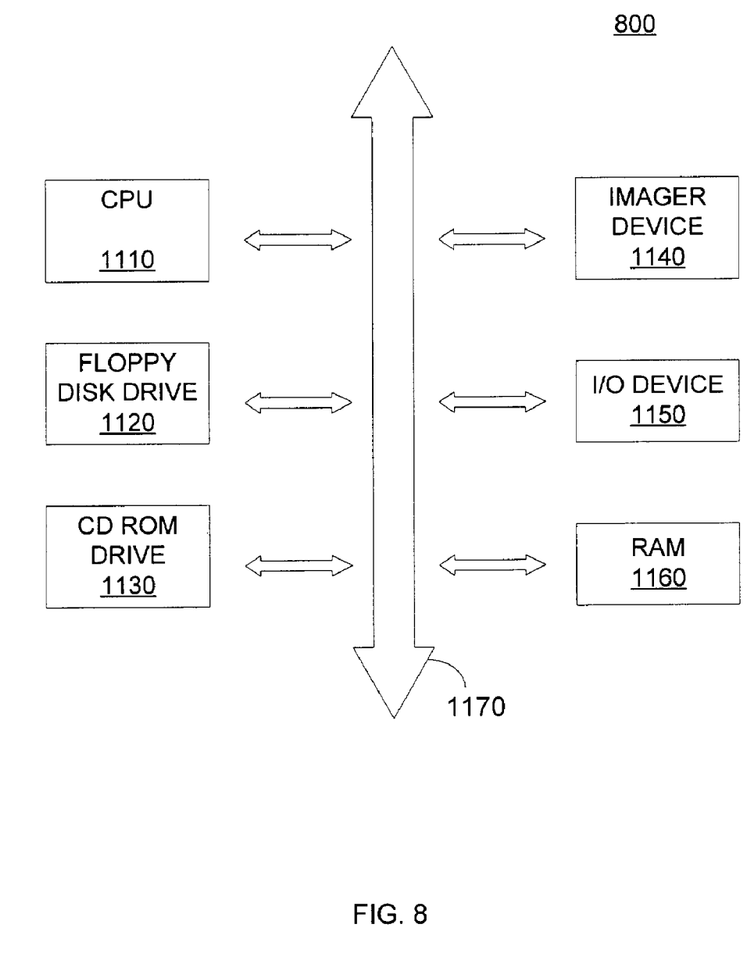
FIG. 8 is a block diagram representation of a processor-based system incorporating a CMOS imaging device in accordance with an exemplary embodiment of the invention.

The method and apparatus aspects of the invention are embodied in an image device 1140 shown in FIG. 8 which provides an image output signal. The image output signal can also be applied to a processor system 800, also illustrated in FIG. 8. A processor based system, such as a computer system, for example, generally comprises a central processing unit (CPU) 1110, for example, a microprocessor, that communicates with one or more input/output (I/O) devices 1150 over a bus 1170. The CPU 1110 also exchanges data with random access memory (RAM) 1160 over bus 1170, typically through a memory controller. The processor system may also include peripheral devices such as a floppy disk drive 1120 and a compact disk (CD) ROM drive 1130 which also communicate with CPU 1110 over the bus 1170. Imager device 1140 is coupled to the processor system and includes a pixel storage and readout circuit as described along with respect to FIG. 6.

While the invention has been described and illustrated with reference to specific exemplary embodiments, it should be understood that many modifications and substitutions can be made without departing from the spirit and scope of the invention. Although the embodiments discussed above describe a specific circuit layout with a specific number of transistors, photodiodes, switches, conductive lines, the present invention is not so limited. Furthermore, many of the above embodiments described are shown with respect to the operation of the sample and hold of a desired pixel that is a 3T pixel, the spirit of the invention is not limited to 3T pixels. Accordingly, the invention is not to be considered as limited by the foregoing description but is only limited by the scope of the claims.

What is claimed as new and desired to be protected by Letters Patent of the United States is:

1. A sample and hold circuit for an imager, comprising:
a selection circuit for selectively coupling a common node to a pixel output column line and for sequentially coupling a first and second storage element to said common node to sample and store respective pixel output signals, said selection circuit for selectively uncoupling said common node from said pixel output column line and for selectively coupling said first and second storage elements through said common node to transfer said stored respective pixel output signals to an output stage, said selection circuit selectively couples said common node to a first voltage, said selection circuit further comprises:
a first switch, disposed between said common node and said column line;
a second switch, disposed between said common node and said first storage element;
a third switch, disposed between said common node and said second storage element;
a second selection circuit for selectively coupling a second voltage to said first storage element; and
a third selection circuit for selectively coupling said second voltage to said second storage element.

2. The sample and hold circuit of claim 1, wherein said second voltage is a clamp voltage.

3. A sample and hold circuit for an imager, comprising:
a first switch for selectively coupling a common node to an imager array column line;
a first storage circuit for sampling and holding a first signal from said imager array column line, said first storage circuit having an input side and an output side;
a second switch for selectively coupling the input side of said first storage circuit to said common node;
a second storage circuit for sampling and holding a second signal from said imager array column line, said second storage circuit having an input side and an output side; and
a third switch for selectively coupling the input side of said second storage circuit to said common node,
a fourth switch for selectively coupling the output side of said first storage circuit to an output stage; and
a fifth switch for selectively coupling the output side of said second storage circuit to said output stage, wherein said fourth and fifth switches are controlled by a common pulse.

4. A sample and hold circuit for an imager, comprising:
a first switch for selectively coupling a common node to an imager array column line;
a first storage circuit for sampling and holding a first signal from said imager array column line, said first storage circuit having an input side and an output side;
a second switch for selectively coupling the input side of said first storage circuit to said common node;
a second storage circuit for sampling and holding a second signal from said imager array column line, said second storage circuit having an input side and an output side; and
a third switch for selectively coupling the input side of said second storage circuit to said common node,
a fourth switch for selectively coupling the output side of said first storage circuit to an output stage;
a fifth switch for selectively coupling the output side of said second storage circuit to said output stage; and
a sixth switch and a seventh switch for respectively coupling a clamp voltage to the output side of said first and second storage circuits.

5. The sample and hold circuit of claim 4, further comprising an eighth switch for selectively coupling a load voltage to said common node.

6. The sample and hold circuit of claim 5, wherein said load voltage is a Vln voltage.

7. A sample and hold circuit for an imager, comprising:
a selection circuit for selectively coupling a common node to an imager column line and for sequentially coupling a first and second storage element to said common node to sample and store respective imager output signals, wherein said selection circuit further comprises:
a first switch, disposed between said common node and said imager column line;
a second switch, disposed between said common node and said first storage element;
a third switch, disposed between said common node and said second storage element; and a fourth switch for coupling said common node to a load voltage,
wherein said first and fourth switches being selected,
wherein said second and third switches being sequentially selected while said first and fourth switches being selected.

8. The circuit of claim 7, wherein said second and third switches being selected while said first and fourth switches not being selected.

9. A sample and hold circuit for an imager, comprising:
a selection circuit for selectively coupling a common node to an imager column line and for sequentially coupling a first and second storage element to said common node to sample and store respective imager output signals, wherein said selection circuit further comprises:
a first switch, disposed between said common node and said imager;
a second switch, disposed between said common node and said first storage element;
a third switch, disposed between said common node and said second storage element; and
a fourth switch for coupling said common node to a load voltage,
wherein said first and fourth switches being selected,
wherein said second and third switches being sequentially selected while said first and fourth switches being selected.

10. The circuit of claim 9, wherein said first and second switches being unselected after said first and fourth switches being selected.

11. The circuit of claim 10, wherein said second and third switches being selected while said first and fourth switches not being selected.

12. A sample and hold circuit for an imager, comprising:
a selection circuit for selectively coupling a common node to an imager column line and for sequentially coupling a first and second storage element to said common node to sample and store respective imager output signals, wherein said selection circuit further comprises:
a first switch, disposed between said common node and said imager;
a second switch, disposed between said common node and said first storage element;
a third switch, disposed between said common node and said second storage element;
a fourth switch for coupling said common node to a load voltage, said fourth switch being controlled by a fourth signal; and
wherein said second and third switches being individually controlled by respective first and second sample signals during a sampling operation, said second and third switches being commonly controlled by a charge transfer signal during a charge transfer operation, said charge transfer signal being the result of AND'ing together cross bar and column select signals.

13. The circuit of claim 12, further comprising:
a first gate for OR'ing together said first sample and charge transfer signals provided to said second switch; and
a second gate for OR'ing together said second sample and charge transfer signals provided to said third switch.

14. A sample and hold circuit for an imager, comprising:
a first switch for selectively coupling a common node to an imager array column line;
a first storage circuit for sampling and holding a first signal from said imager array column line, said first storage circuit having an input side and an output side;
a second switch for selectively coupling the input side of said first storage circuit to said common node;
a second storage circuit for sampling and holding a second signal from said imager array column line, said second storage circuit having an input side and an output side;
a third switch for selectively coupling the input side of said second storage circuit to said common node;
a fourth switch for selectively coupling the output side of said first storage circuit to an output stage;
a fifth switch for selectively coupling the output side of said second storage circuit to said output stage;
a sixth switch for selectively coupling a load voltage to said common node;
a seventh switch for selectively coupling a clamp voltage to said output side of said first storage circuit;
a eighth switch for selectively coupling said clamp voltage to said output side of said second storage circuit; and
wherein said first switch being controlled by a column select global control signal, said second switch being controlled by OR'ing together a first sample signal and a charge transfer control signal, said third switch being controlled by OR'ing together a second sample signal and said charge transfer control signal, said fourth and fifth switches being controlled by a column select control signal, said sixth switch being controlled by an enable control signal, said seventh and eighth switches being controlled by a clamp control signal.

15. A method of operating a sample and hold circuit in an imaging pixel array, said method comprising:

selectively connecting a selected imager array column line to a common node in said sample and hold circuit;

selectively connecting said common node to a first storage circuit, thereby coupling said first storage circuit to said selected column line;

storing a first signal from said selected column line in said first storage circuit;

selectively connecting said common node to a second storage circuit, thereby coupling said second storage circuit to said selected column line;

storing a second signal from said selected column line in said second storage circuit selectively disconnecting said common node from said first storage circuit, after said first signal is stored; and selectively disconnecting said common node from said second storage circuit, after said second signal is stored.

16. The method of claim 15, further comprising:

selectively disconnecting said common node from said selected column line, after said first and second signals are stored.

17. The method of claim 16, further comprising:

selectively contemporaneously coupling the input side of said first and the input side of said second storage circuits while selectively coupling said output sides of said first and second storage circuits to an output stage.

18. The method of claim 17, wherein the selective coupling of the said first and second storage circuits to said output stage is controlled by a common signal.

19. The method of claim 18, further comprising the step of initially coupling a clamp voltage to said first and second storage circuits.

20. The method of claim 19, further comprising the step of coupling a load voltage to said first and second storage circuits prior to said storing of said first and said second signals.

21. A method of operating a sample and hold circuit in an imaging pixel array, said method comprising:

selectively connecting a selected imager array column line to a common node in said sample and hold circuit, selectively coupling said common node to a load voltage, coupling the output sides of a first and second storage circuits to a clamp voltage;

hereafter, selectively connecting said common node to an input side of said first storage circuit, thereby coupling said first storage circuit to said selected column line;

thereafter, storing a first signal from said selected pixel in said first storage circuit;

thereafter, selectively disconnecting said common node from said first storage circuit;

thereafter, selectively connecting said common node to an input side of said second storage circuit, thereby coupling said second storage circuit to said selected column line;

thereafter, storing a second signal from said selected column line in said second storage circuit;

thereafter, selectively disconnecting said common node from said second storage circuit;

thereafter, selectively disconnecting said selected column line from said common node;

thereafter, selectively connecting an output side of said first storage circuit to an output stage;

thereafter, selectively connecting an output side of said second storage circuit to said output stage; and thereafter, selectively connecting said input side of said first storage circuit and said input side of said second storage circuit.

22. A processor system, comprising:

a central processing unit;

array imager coupled to said central processing unit, said imager comprising:

a sample and hold circuit, comprising:

a selection circuit for selectively coupling a common node to a pixel output column line and for sequentially coupling a first and second storage element to said common node to sample and store respective pixel output signals, said selection circuit for selectively uncoupling said common node from said pixel output column line and for selectively coupling said first and second storage elements through said common node to transfer said stored respective pixel output signals to an output stage comprising:

a first switch, disposed between said common node and said column line;

a second switch, disposed between said common node and said first storage element;

a third switch, disposed between said common node and said second storage element, wherein said selection circuit selectively couples said common node to a first voltage, wherein said first voltage is a load voltage;

a second selection circuit for selectively coupling a second voltage to said first storage element; and a third selection circuit for selectively coupling said second voltage to said second storage element.

23. The processor of claim 22, wherein said second voltage is a clamp voltage.

\* \* \* \* \*

UNITED STATES PATENT AND TRADEMARK OFFICE
CERTIFICATE OF CORRECTION

PATENT NO. : 7,365,784 B2 Page 1 of 1
APPLICATION NO. : 10/413365
DATED : April 29, 2008
INVENTOR(S) : Rossi

It is certified that error appears in the above-identified patent and that said Letters Patent is hereby corrected as shown below:

In column 9, line 12, in Claim 15, after "circuit" insert -- ; --.

In column 9, line 44, in Claim 21, delete "hereafter" and insert -- thereafter --, therefor.

Signed and Sealed this

Twenty-ninth Day of July, 2008

JON W. DUDAS
*Director of the United States Patent and Trademark Office*